(12) United States Patent
Lugo

(10) Patent No.: US 11,227,243 B2
(45) Date of Patent: Jan. 18, 2022

(54) COMMUNICATION SYSTEM WITH ENTERPRISE ANALYSIS AND METHODS FOR USE THEREWITH

(71) Applicant: AT&T Intellectual Property I, L.P., Atlanta, GA (US)

(72) Inventor: Michael Thomas Lugo, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1594 days.

(21) Appl. No.: 15/010,878

(22) Filed: Jan. 29, 2016

(65) Prior Publication Data

US 2017/0220968 A1    Aug. 3, 2017

(51) Int. Cl.
*G06Q 10/06* (2012.01)
*H04W 4/08* (2009.01)
*H04W 4/029* (2018.01)
*H04W 4/33* (2018.01)

(52) U.S. Cl.
CPC ...... *G06Q 10/06314* (2013.01); *H04W 4/029* (2018.02); *H04W 4/08* (2013.01); *H04W 4/33* (2018.02)

(58) Field of Classification Search
CPC .............................................. G06Q 10/06314
See application file for complete search history.

(56) References Cited

U.S. PATENT DOCUMENTS

| 7,831,454 | B2 | 11/2010 | Nguyen et al. |
| 9,154,915 | B2 | 10/2015 | Fabrikant et al. |
| 9,165,304 | B2 | 10/2015 | Weiss et al. |
| 2007/0210937 | A1* | 9/2007 | Smith ............. G06Q 30/02 340/995.1 |
| 2009/0024546 | A1 | 1/2009 | Ficcaglia et al. |

(Continued)

FOREIGN PATENT DOCUMENTS

JP    H0635896 A    10/1994

OTHER PUBLICATIONS

Jihoon Ryoo et al, Geo-Fencing: Geographical-Fencing based Energy-Aware Proactive Framework for Mobile Devices, 2012 IEEE 20th International Workshop on Quality of Service, 2012, pp. 1-9 (Year: 2012).*

(Continued)

*Primary Examiner* — Andre D Boyce
(74) *Attorney, Agent, or Firm* — Hartman & Citrin LLC

(57) ABSTRACT

Aspects of the subject disclosure may include, for example, a communication system that receives location data associated with mobile devices over a time period and evaluates the location data to predict hours of operation of an enterprise. The communication system operates by: selecting a first group of mobile devices based on geographical proximity to the enterprise; analyzing the location data to identify a subset of the first group predicted to correspond to employees of the enterprise; selecting a second group of the mobile devices by filtering the subset from the first group; analyzing the location data corresponding to the second group over the period of time to determine aggregate time periods when the second group are in the geographical proximity to the enterprise; and predicting the hours of operation of the enterprise according to the aggregate time periods. Other embodiments are disclosed.

12 Claims, 9 Drawing Sheets

(56) References Cited

U.S. PATENT DOCUMENTS

| | | |
|---|---|---|
| 2010/0057532 A1 | 3/2010 | Sanguinetti et al. |
| 2012/0183172 A1* | 7/2012 | Stroila ............... G01C 21/3602 |
| | | 382/100 |
| 2012/0265580 A1 | 10/2012 | Kobayashi et al. |
| 2014/0195320 A1* | 7/2014 | Busch .................. H04W 4/029 |
| | | 705/14.25 |
| 2014/0214484 A1 | 7/2014 | Hirakawa et al. |
| 2014/0249887 A1 | 9/2014 | Parkkinen et al. |
| 2015/0148071 A1* | 5/2015 | Elmore ................. H04W 4/023 |
| | | 455/456.2 |
| 2015/0149236 A1 | 5/2015 | Sakamoto |
| 2015/0178739 A1 | 6/2015 | Ghosh et al. |
| 2015/0213499 A1 | 7/2015 | Omoigui |
| 2015/0242899 A1 | 8/2015 | Farhi |
| 2016/0253710 A1* | 9/2016 | Publicover .............. H04W 4/21 |
| | | 705/14.66 |
| 2017/0177723 A1* | 6/2017 | Price ........................ H04W 4/04 |

OTHER PUBLICATIONS

Desmarais: This Smartphone Tracking Tech Will Give You the Creeps; 6 pgs [downloaded from the internet: http://www.pcworld.com/article/255802/new_ways_to_track_you_via_your_mobile_devices_big_brother_or_good_business_.html].

* cited by examiner

400

450

475

800

COMMUNICATION SYSTEM WITH ENTERPRISE ANALYSIS AND METHODS FOR USE THEREWITH

FIELD OF THE DISCLOSURE

The subject disclosure relates to communication systems and networks that interact with mobile devices.

BRIEF DESCRIPTION OF THE DRAWINGS

Reference will now be made to the accompanying drawings, which are not necessarily drawn to scale, and wherein.

DETAILED DESCRIPTION

Figure 1:
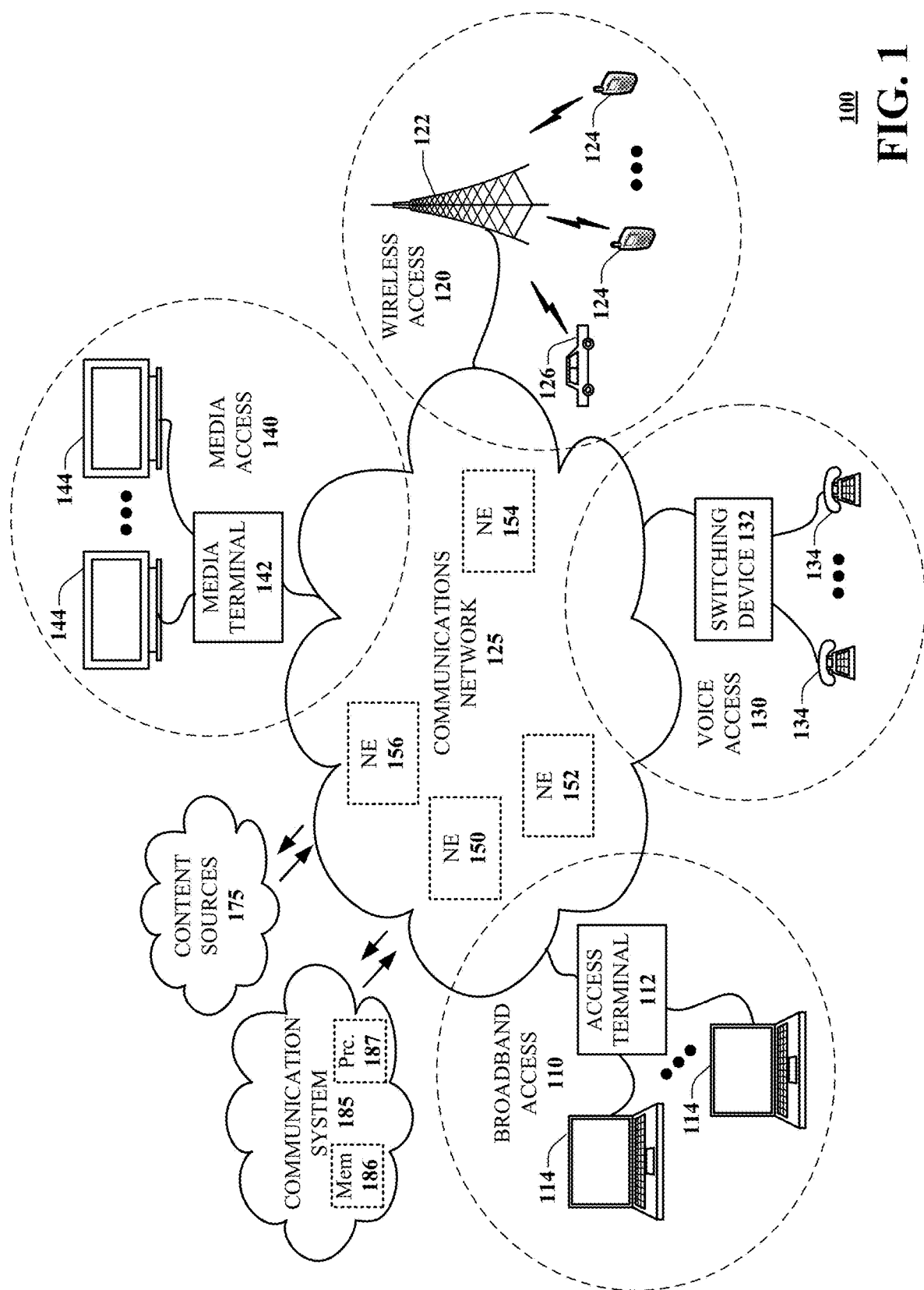
FIG. 1 is a block diagram illustrating an example, non-limiting embodiment of a communications network in accordance with various aspects described herein.

One or more embodiments are now described with reference to the drawings, wherein like reference numerals are used to refer to like elements throughout. In the following description, for purposes of explanation, numerous details are set forth in order to provide a thorough understanding of the various embodiments. It is evident, however, that the various embodiments can be practiced without these details (and without applying to any particular networked environment or standard).

In accordance with one or more embodiments, a communication system includes at least one memory that stores executable instructions. At least one processor coupled with the memory and responsive to executing the instructions, facilitates performance of operations comprising: receiving location data associated with mobile devices over a time period; and evaluating the location data to predict hours of operation of an enterprise by: selecting a first group of the mobile devices based on geographical proximity to the enterprise; analyzing the location data to identify a subset of the first group of the mobile devices predicted to correspond to employees of the enterprise; selecting a second group of the mobile devices by filtering the subset from the first group of the mobile devices; analyzing the location data corresponding to the second group of the mobile devices over the period of time to determine aggregate time periods when the second group of the mobile devices are in the geographical proximity to the enterprise; and predicting the hours of operation of the enterprise according to the aggregate time periods.

In accordance with one or more embodiments, a method includes receiving location data associated with mobile devices over a time period; evaluating the location data to predict hours of operation of an enterprise by: selecting a first group of the mobile devices based on geographical proximity to the enterprise; analyzing the location data to identify a subset of the first group of the mobile devices predicted to correspond to employees of the enterprise; selecting a second group of the mobile devices by filtering the subset from the first group of the mobile devices; analyzing the location data corresponding to the second group of the mobile devices over the period of time to determine aggregate time periods when the second group of the mobile devices are in the geographical proximity to the enterprise; and predicting the hours of operation of the enterprise according to the aggregate time periods.

In accordance with one or more embodiments, an article of manufacture includes a tangible storage medium that stores operational instructions, that when executed by a processor, causes the processor to receive location data associated with mobile devices over a time period and evaluate the location data to predict hours of operation of an enterprise by selecting a first group of the mobile devices based on geographical proximity to the enterprise; analyzing the location data to identify a subset of the first group of the mobile devices predicted to correspond to employees of the enterprise; selecting a second group of the mobile devices by filtering the subset from the first group of the mobile devices; analyzing the location data corresponding to the second group of the mobile devices over the period of time to determine aggregate time periods when the second group of the mobile devices are in the geographical proximity to the enterprise; and predicting the hours of operation of the enterprise according to the aggregate time periods.

Referring now to FIG. 1, a block diagram 100 illustrating an example, non-limiting embodiment of a communications network in accordance with various aspects described herein, is shown. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text or other media. While broadband access 110, wireless access 120, voice access 130 and media access 140 are shown separately, one or more of these forms of access can be combined to provide multiple access services to a single client device.

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched telephone network, a voice over Internet protocol (VoIP) network, Internet protocol (IP) based television network, a cable network, a passive or active optical network, a 4G or higher wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G or higher modem, an optical modem and/or other access devices.

In various embodiments, the base station or access point 122 can include a 4G or higher base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Databases of commercial establishments or other enterprises typically include information on the hours when those establishments are open that can be published via a website or consumer application that is available to potential customers. This data is often manually sourced and can be incorrect as a result. Such data can be augmented with social media check-ins to an establishment but these are highly voluntary and may not capture information on establishments with demographics skewing away from such sites. In addition potential customers of an enterprise may be interested in information on when it is particularly busy or not busy in order to decide when to make their own trips. Data collected from customer phones and/or from the communications network 125 can provide more accurate information on consumer traffic within an enterprise than that which users must manually enter.

A communication system 185 is configured to communicate with the communications network 125 via a wired or wireless interface and to determine the number of customers who visit an establishment in any given time period based on information—such as who logs into the WiFi system via a mobile device of the enterprise or have cell-phone locations that fall within a store or other commercial establishment.

The communication system 185 includes at least one memory 186 and at least one processor 187. In various embodiments, the communication system 185 receives location data via the communications network 125 associated with mobile devices over a time period and evaluates the location data to predict hours of operation of an enterprise. The communication system 185 operates by: selecting a first group of mobile devices based on geographical proximity to the enterprise; analyzing the location data to identify a subset of the first group predicted to correspond to employees of the enterprise; selecting a second group of the mobile devices by filtering the subset from the first group; analyzing the location data corresponding to the second group over the period of time to determine aggregate time periods when the second group are in the geographical proximity to the enterprise; and predicting the hours of operation of the enterprise according to the aggregate time periods. This data regarding hours of operation can be stored in memory 186, can enable the creation of databases that enhance user experience and can be shared with one or more content sources 175 that maintain such information. Such content sources 175 could make this data available to their customers via web servers and or consumer applications, enhancing the user experience.

It should be noted that, while shown as a separate unit, communication system 185 could be implemented via one or more servers of content sources 175, or be included in the communications network 125.

Figure 2:
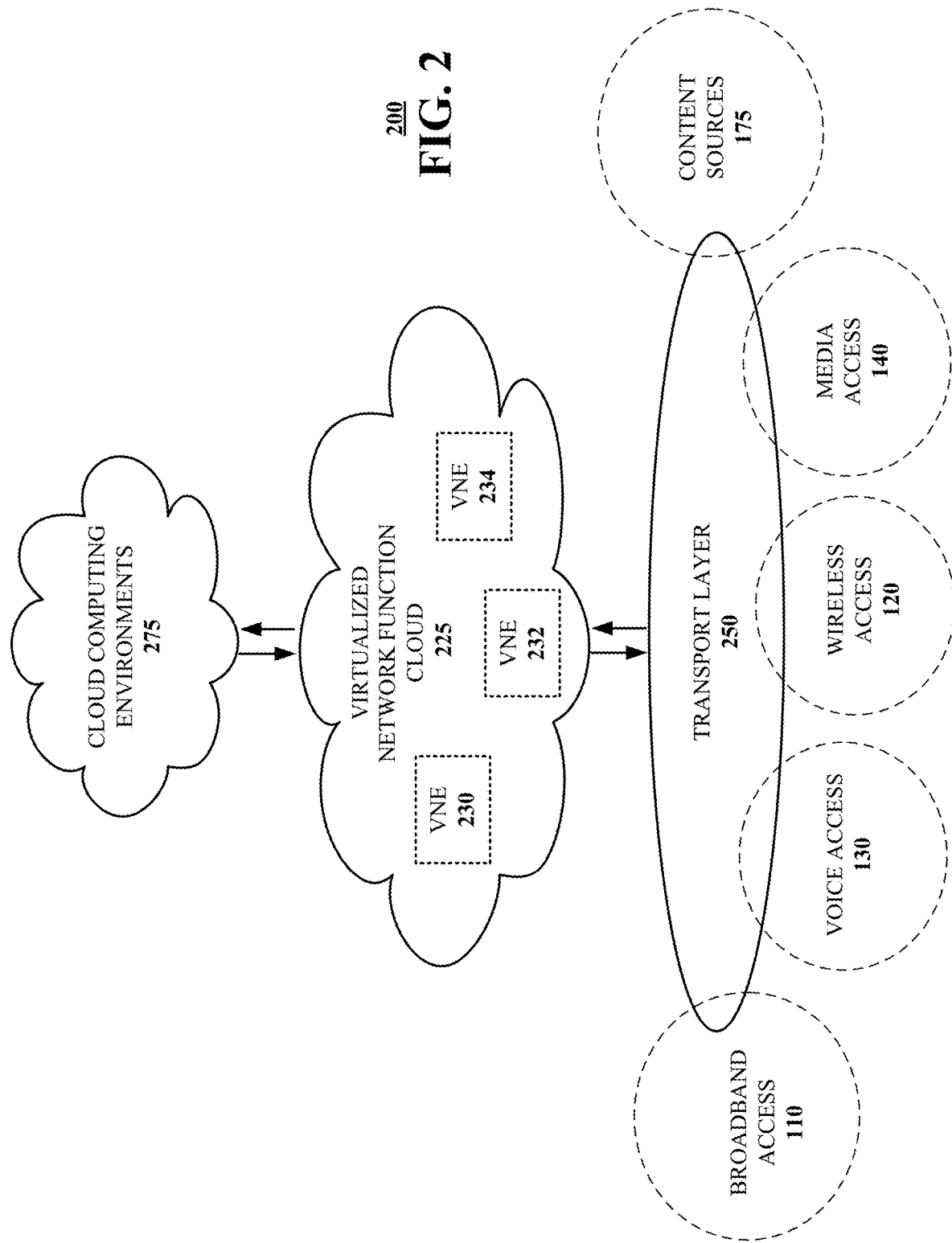
FIG. 2 is a block diagram illustrating an example, non-limiting embodiment of a virtualized communication network in accordance with various aspects described herein.

Referring now to FIG. 2, a block diagram 200 illustrating an example, non-limiting embodiment of a virtualized communication network in accordance with various aspects described herein, is shown. In particular, a virtualized communication network is presented that can be used to implement some or all of the communications network 125 presented in conjunction with FIG. 1.

In particular, a cloud networking architecture is shown that leverages cloud technologies and supports rapid innovation and scalability via a transport layer 250, virtualized network function cloud 225 and/or one or more cloud computing environments 275. In various embodiments, this cloud networking architecture is an open architecture that leverages application programming interfaces (APIs), reduces complexity from services and operations; supports more nimble business models and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 230, 232, 234, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrate. The most typical type of substrate being servers that support Network Function Virtualization (NFV), followed by packet forwarding capabilities based on generic computing resources, with specialized network technologies brought to bear when general purpose processors or merchant silicon are not appropriate. In this case, communication services can be implemented as cloud-centric workloads.

As an example, a traditional network element 150, such as an edge router can be implemented via a virtual network element 230 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing that infrastructure easier to manage.

In an embodiment, the transport layer 250 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 230, 232 or 234. These network elements can be included in transport layer 250.

The virtualized network function cloud 225 interfaces with the transport layer 250 via APIs or other interfaces to allow the virtual network elements 230, 232, 234, etc., to provide specific NFVs. In particular, the virtualized network function cloud 225 leverages cloud operations, applications, and architectures to support networking workloads. The virtualized network elements 230, 232 and 234 can employ network function software that provides either a one-for-one mapping of traditional network element function or alternately some combination of network functions designed for cloud computing. For example, virtualized network elements 230, 232 and 234 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large aggregates of traffic, their workload can be distributed across a number of servers—each of which adds a portion of the capability, and overall which creates an elastic function with higher availability than its former monolithic version. These virtual network elements 230, 232, 234, etc. can be instantiated and managed using an orchestration approach similar to those used in cloud compute services.

The cloud computing environments 275 can interface with the virtualized network function cloud 225 via APIs that expose functional capabilities of the VNE 230, 232, 234, etc., to provide the flexible and expanded capabilities to the virtualized network function cloud 225. In particular, network workloads may have applications distributed across the virtualized network function cloud 225 and cloud computing environment 275 and in the commercial cloud, or might simply orchestrate workloads supported entirely in NFV infrastructure from these third party locations.

Figure 3:
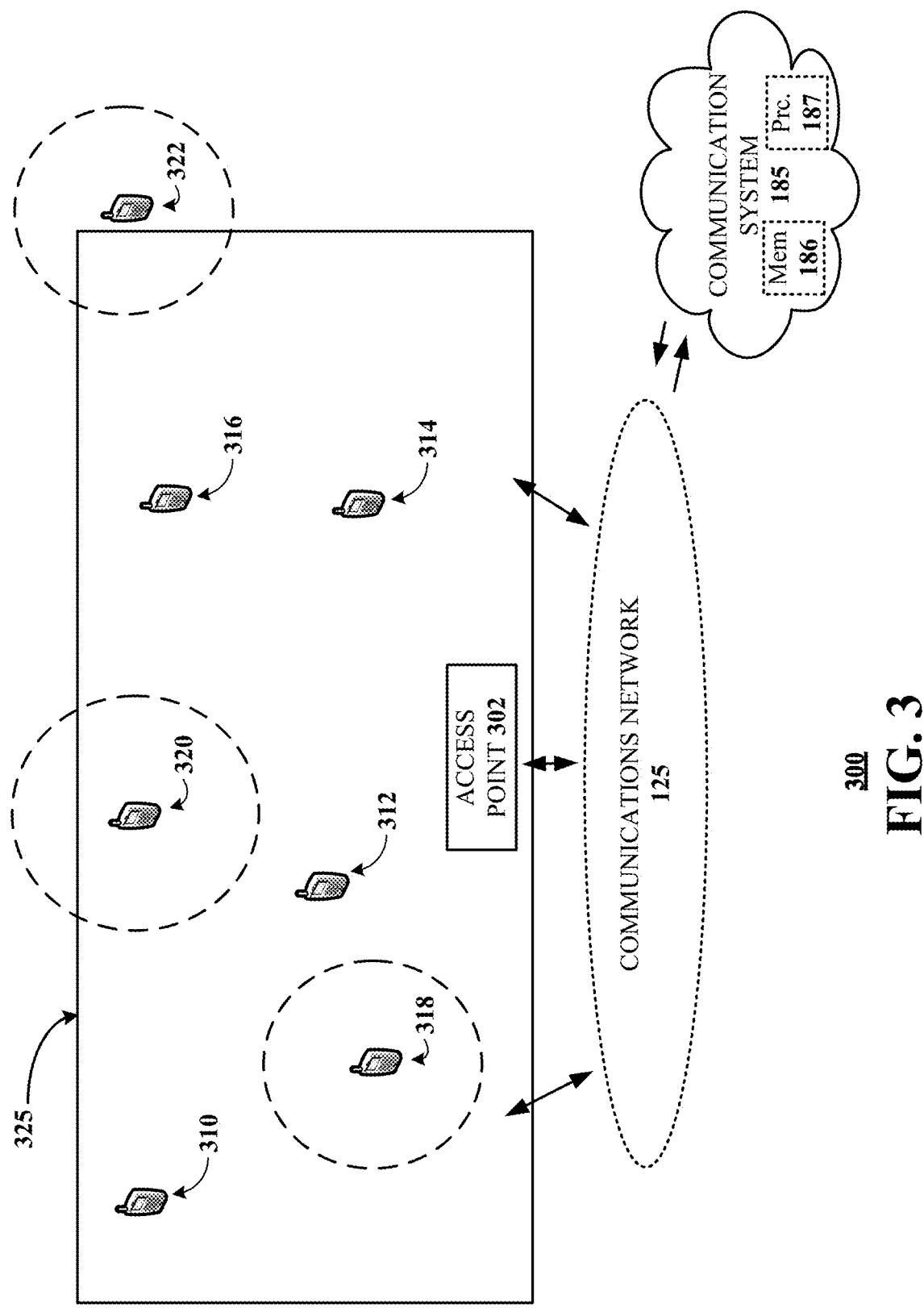
FIG. 3 is a block diagram illustrating an example, non-limiting embodiment of an enterprise layout in accordance with various aspects described herein.

Turning now to FIG. 3, a block diagram 300 is shown illustrating an example, non-limiting embodiment of an enterprise layout in accordance with various aspects described herein. In particular, a boundary 325 is presented for a commercial establishment such as a store, restaurant, service location, kiosk, entertainment venue, or other enterprise. As shown, the enterprise includes an access point 302 that is coupled to communications network 125 to provide wireless broadband access to mobile devices 310, 312, 314 and 316 that are inside the enterprise and associated with the access point 302. In addition, the mobile devices 318, 320 and 322 are shown that communicate with the communications network 125 via wireless access. The mobile devices 318 and 320 are inside the enterprise, while the mobile device 322 is outside of the enterprise.

In various embodiments, the communication system 185 receives location data associated with mobile devices over a time period, such as for the same day of the week over multiple weeks, however other time periods such as a 24-hour period, a portion of a particular day of the week, over a full week, or over some other time period can also be evaluated. The processor 187 of the communication system 185 evaluates the location data to predict hours of operation of an enterprise, on a day of the week basis for example, by selecting a first group of the mobile devices based on geographical proximity to the enterprise.

The location data can be received from the communications network 125 continuously or periodically or otherwise within the relevant time period and include data indicating that a mobile device, such as mobile devices 310, 312, 314 or 316, is associated with the access point 302 of the enterprise at that time. In particular, the processor 187 retrieves an Internet protocol (IP) address, device identifier or other information from the access point 302 or via the communications network 125 that can be used to determine which particular devices are associated with the access point 302. In accordance with the example shown, the mobile devices 310, 312, 314 or 316 are selected for inclusion in the first group based on the location data indicating an association of each of these mobile devices with the access point 302. While the enterprise location is shown with a single access point 302, it should be noted that in other examples, mobile devices associated with any one of multiple access points in the enterprise can be selected for inclusion in the first group.

In addition or in the alternative, the location data can be received from the communications network 125 over the relevant time period and include geographical coordinates of a mobile device received from a global positioning system (GPS) device of the mobile device or derived by the communications network 125 via base station association or triangulation or other location technique. In accordance with the example shown, the mobile devices 318 and 320 are selected for inclusion in the first group and mobile device 322 is excluded from the first group based on a comparison of the corresponding location data to the location of the enterprise and its corresponding boundary 325.

In addition to including geographical coordinates, the location data can further include an error measure that indicates the accuracy of those geographical coordinates. For example, the error measure can be in the form of circular error probable (CEP) data that defines a probabilistic error radius about the geographical coordinates that indicate bounds on the true location of the corresponding device to a certain level of statistical certainty, however other error measures can likewise be employed. In the example shown, CEP data for the mobile devices 318, 320 and 322 define circular CEP regions about each device that are bounded by dashed circles. Mobile devices 318 can be determined to be within the enterprise because its CEP region falls entirely within the boundary 325. While the true location of mobile device 320 falls within the boundary 325, the location data indicates some uncertainty due to the fact that a portion of its corresponding CEP region falls outside of the boundary 325. Conversely, while the true location of mobile device 322 falls outside the boundary 325, the location data indicates some chance the mobile device 322 is actually inside the enterprise due to the fact that a portion of its corresponding CEP region falls inside of the boundary 325. The processor 187 can adapt to this uncertainty inherent in the comparison of the location data to the location of the enterprise by applying a probabilistic filter based on the measure of error associated with the geographical coordinate data. For example, the processor 187 can assign mobile device 320 as being 70% in the enterprise and mobile device 322 as being 30% in the enterprise, and as a consequence, assign weighting factors of 0.7 and 0.3 to proximity data to the mobile devices 320 and 322 in conjunction with further analysis associated with the particular time the location data represents. The location data can change for the mobile devices 320 and 322 in terms of both the geographical coordinates and the measure of error as the mobile devices move about, change positions or stay stationary for longer periods allowing more accurate locations to be determined and the weighting factors can be updated accordingly in a range of values between, for example [0, 1], in order to adapt to changing conditions.

The processor 187 continues by analyzing the location data to identify a subset of the first group of the mobile devices predicted to correspond to employees of the enterprise. It is assumed that one or more employees may arrive early and/or leave late and possibly skew the calculation of open hours. The processor 187 can filter out employees of an establishment who may be there before opening or after closing. For example, the processor 187 selects a second group of the mobile devices, predicted to exclude employees of the enterprise, by filtering the subset from the first group of the mobile devices.

The processor 187 can identify the subset of the mobile devices in use by employees by determining a duration each of the mobile devices in the first group is in the geographical proximity to the enterprise on a particular date within the time period. This can be accomplished by identifying those mobile devices in the establishment for long periods of time (multiple hours) and/or on multiple occasions per week. The employee mobile devices can be included in the subset for filtration when the duration exceeds a duration threshold. In this fashion, mobile devices present in the enterprise for greater than, four hours for example, can be assumed to correspond to employees and included in the subset and excluded from the second group of mobile devices predicted to contain only customers. In addition, the processor 187 can store identifiers for the mobile devices in the employee subset in a database of predicted employees of a particular enterprise included in memory 186. When new first groups are formed during an analysis of location data for subsequent time periods, the database of predicted employees for the enterprise can be consulted. In this fashion, when any one of these mobile devices appears in the first group, these mobile devices can automatically be added to the subset and excluded from the second group if found to be already stored in the database of predicted employees.

Considering the example shown, location data for a particular day of the week indicates that the mobile device 312 has been present for longer than four hours on several occasions and is excluded from the second group of mobile devices as a result. It should be noted that while a four hour threshold is described above, other thresholds can apply. Further, the processor 187 can apply different thresholds to different types of enterprises. In this fashion, a larger threshold can be applied to a restaurant, automotive repair shop or a coffee shop—and a smaller threshold applied to a bakery or a gas station where shorter customer durations are expected.

The processor 187 proceeds by analyzing the location data corresponding to the second group over the period of time to determine aggregate time periods when the second group of the mobile devices is in the geographical proximity to the enterprise. The processor 187 predicts the hours of operation of the enterprise according to the aggregate time periods, for example by determining a time of day when customers begin to arrive at the enterprise and when they leave the enterprise, by determining that customers appear to be present over full 24-hour periods corresponding to an enterprise predicted to be open 24 hours, etc. A discussed above, the processor 187 can operate by assigning weighting factors to mobile devices according to a measure of error associated with the location data for these mobile devices. The processor 187 can, for example, generate a customer count in a time period by a summation of probabilistic scores of each mobile device in the second group. The processor 187 can then predict the hours of operation by evaluating the customer count in aggregate time periods and determining when customers begin to arrive and when all customers have left.

While the foregoing description has emphasized the use of the customer count in aggregate time periods to predict hours of operation of an enterprise, this information can be analyzed by processor 187 for other purposes as well. For example, the processor 187 can evaluate the location data corresponding to the second group of the mobile devices over the time period to predict future busy time periods of the enterprise and/or future non-busy time periods of the enterprise. This can be determined by comparing projected customer counts during time periods to one another or to a median or mean customer count for the enterprise to determine periods of high and low customers. Statistical methods can then be used to smooth this data out and make forecasts of projected number of customers for some future time period. Again, since cell-phone locations are imperfect, as such the customer counts can be interpreted probabilistically, with a low-fidelity location being counted as being fractionally in the store with an appropriate probability that is less than one.

Further examples and implementations including one or more optional functions and features are presented in conjunction with FIGS. 4A-4C and 5-8 that follow.

Figure 4A:
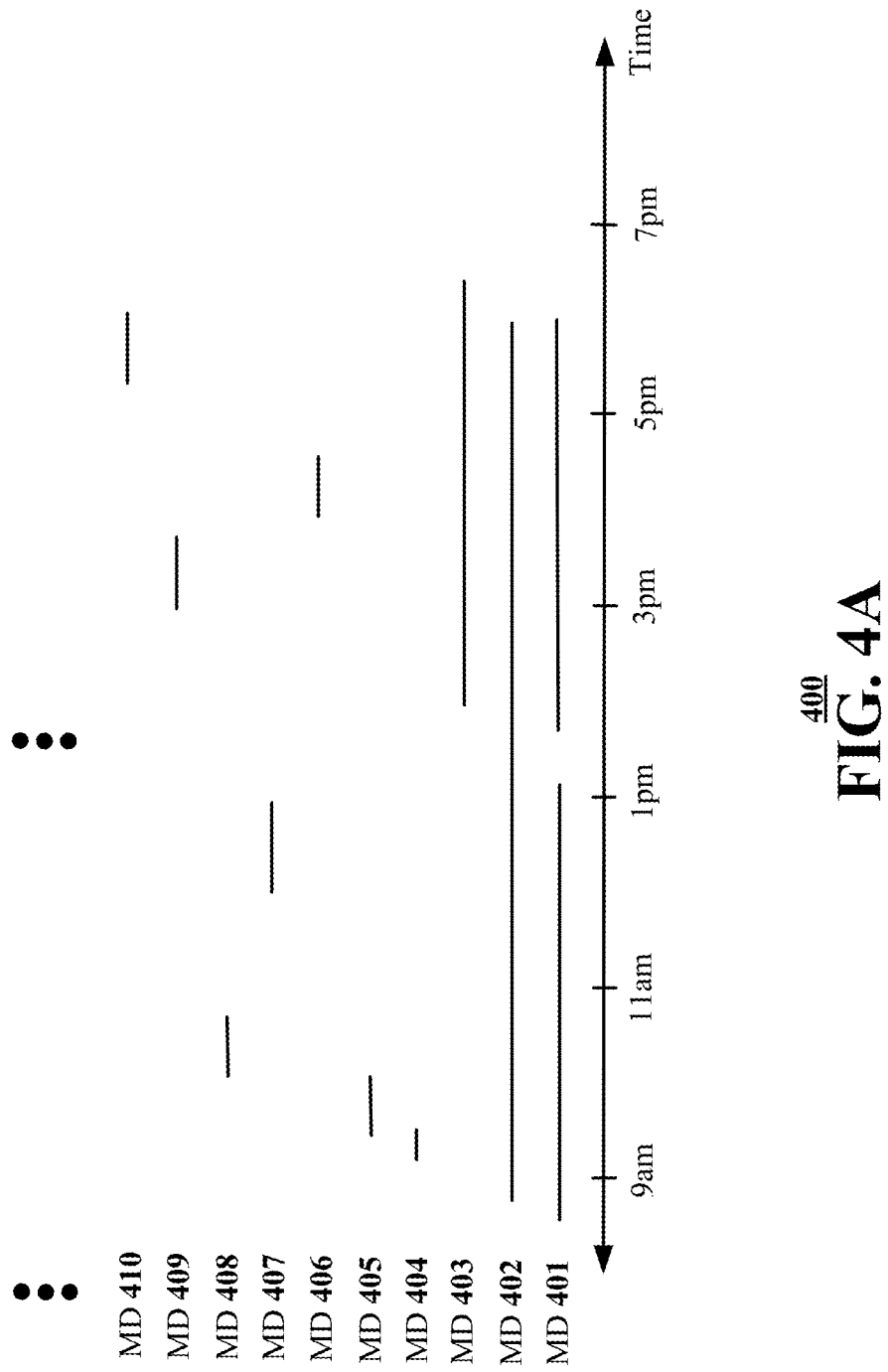
FIG. 4A is a temporal diagram illustrating an example, non-limiting embodiment of periods of geographical proximity in accordance with various aspects described herein.

Turning now to FIG. 4A, a temporal diagram 400 is shown illustrating an example, non-limiting embodiment of periods of geographical proximity in accordance with various aspects described herein. As discussed in conjunction with FIG. 3, the communication system 185 receives location data associated with mobile devices over a time period. The processor 187 of the communication system 185 evaluates the location data to predict hours of operation of an enterprise, on a daily basis for example, by selecting a first group of the mobile devices based on geographical proximity to the enterprise. The diagram 400 represents durations of geographical proximity to a particular enterprise for mobile devices 401-410 over a time period between 9 AM and 7 PM.

The processor 187 operates by analyzing the location data to identify a subset of the mobile devices 401-410 predicted to correspond to employees of the enterprise. In the example shown, the duration data corresponding to mobile devices 401-403 indicates that these mobile devices are likely to correspond to employees. Mobile device 401 is present for over 8 hours with only a short period of absence in the middle of the day. Mobile device 402 is also present for more than 8 hours. Mobile device 403 is present for more than four hours. The processor 187 compares the durations to a 3.5 hour threshold selected for this particular enterprise, selected based on its enterprise type, and filters out mobile devices 401-403, leaving a group of mobile devices 403-410 as predicted customers.

Once the mobile devices 401-403 are identified as being associated with employees, the processor 187 can store identifiers for the mobile devices 401-403 in a database of predicted employees for the particular enterprise. When further duration data is analyzed for the enterprise, the mobile devices 401-403 can automatically be excluded from the group of predicted customers.

It should be noted that while duration data for ten different mobile devices is presented for the purposes of illustration, a greater number of mobile devices could be analyzed in a similar fashion over a greater number of days, such as the same day over multiple weeks. With the exception time periods corresponding to special holiday hours and other alterations to hours of operation, the greater the amount of data considered, the more accurate the predictions of the hours of operation will generally be.

Figure 4B:
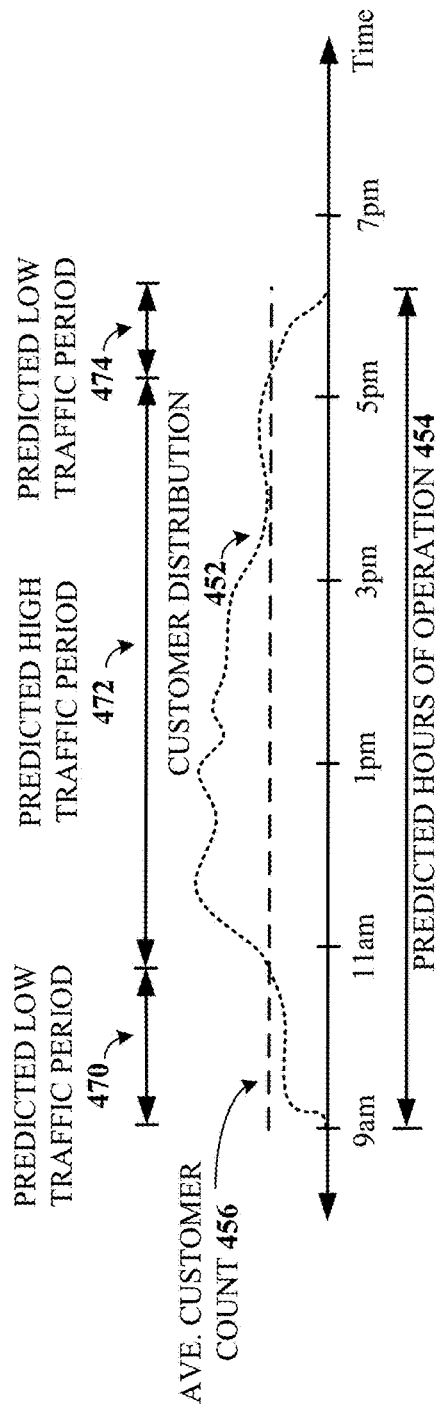
FIG. 4B is a temporal diagram illustrating an example, non-limiting embodiment of a customer distribution in accordance with various aspects described herein.

Turning now to FIG. 4B, a temporal diagram 450 is shown illustrating an example, non-limiting embodiment of a customer distribution in accordance with various aspects described herein. As discussed in conjunction with FIG. 3, the processor 187 proceeds by analyzing the location data corresponding to the predicted group of customer mobile devices over a period of time to determine aggregate time periods when the these mobile devices are in the geographical proximity to the enterprise. The customer distribution 452 represents a customer count in a time period by a summation of probabilistic scores of each mobile device in the predicted customer group. In this fashion, some mobile devices may be estimated to be 100% in the enterprise because they are associated with an access point of the enterprise with no coverage on the outside of the building. Other mobile devices may be estimated to be 100% in the enterprise because their corresponding error measure and geographical coordinates indicate that to a reasonable degree of statistical certainty the mobile device is within the enterprise boundaries. In contrast, other mobile devices may only contribute fractionally to the customer count based on, for instance, their estimated probability of being located within the enterprise.

Statistical methods can then be used to smooth out the customer distribution 452 and eliminate statistical outliers. The processor 187 predicts the hours of operation of the enterprise 454 as being 9 am-6 pm in the example shown, because analysis of the customer distribution 452 indicates that customers only begin to arrive shortly after 9 am and there are no longer customers present after 6 pm. It should be noted that since hours of operations are typically round numbers, the hours of operation can be determined based on the nearest hour, 30-minute or 15 minute interval.

The processor 187 can also evaluate the customer distribution 452 over the time period to predict future busy time periods of the enterprise and/or future non-busy time periods of the enterprise. An average customer count 456 is determined based on a mean, statistical median or other measure of average. The predicted high traffic period 472 is determined as the period between 11 AM and 5 PM because the customer distribution 452 exceeds the average customer count during this time period. The predicted low traffic periods 470 and 474 are determined as the periods between 9 am-11 am and 5:15 pm-6 pm because the customer distribution 452 is less than the average customer count during these time periods. While the foregoing analysis compares the customer distribution to a single threshold corresponding to the average customer count, two or more thresholds can be employed. For example, low traffic periods can be determined when the customer distribution falls below half of the average customer count, with high traffic periods corresponding to periods of where the customer distribution exceeds twice the average customer count, with other time periods being characterized as normal traffic.

Figure 4C:
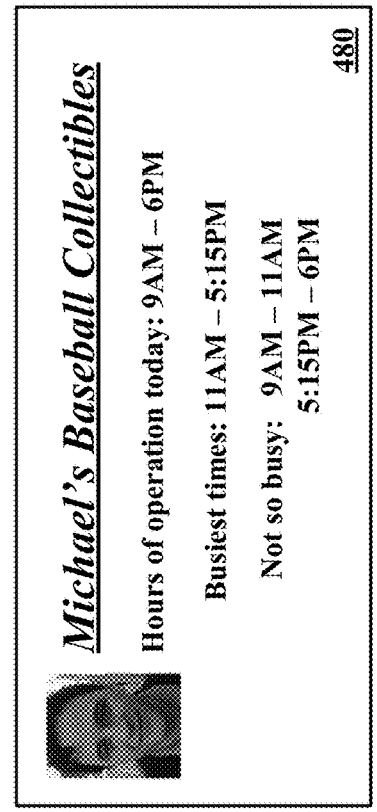
FIG. 4C is a pictorial diagram illustrating an example, non-limiting embodiment of a screen display in accordance with various aspects described herein.

Turning now to FIG. 4C, a pictorial diagram 475 is shown illustrating an example, non-limiting embodiment of a screen display in accordance with various aspects described herein. As discussed in conjunction with FIG. 1, data generated by the communications system 185 can be stored in memory 186, and be used to enable the creation of databases that enhance user experience and could potentially be shared with one or more content sources 175 that maintain such information. Such content sources 175 could make this data available to their customers via web servers and or consumer applications, enhancing the user experience. A screen display 480 of a mobile device or computer is presented in association with a website of a particular enterprise or data provided to a service application or other site or application that presents such enterprise data. In the example shown, hours of operation for the enterprise as well as busy and non-busy times are presented for display and the device and review by potential customers.

Figure 5:
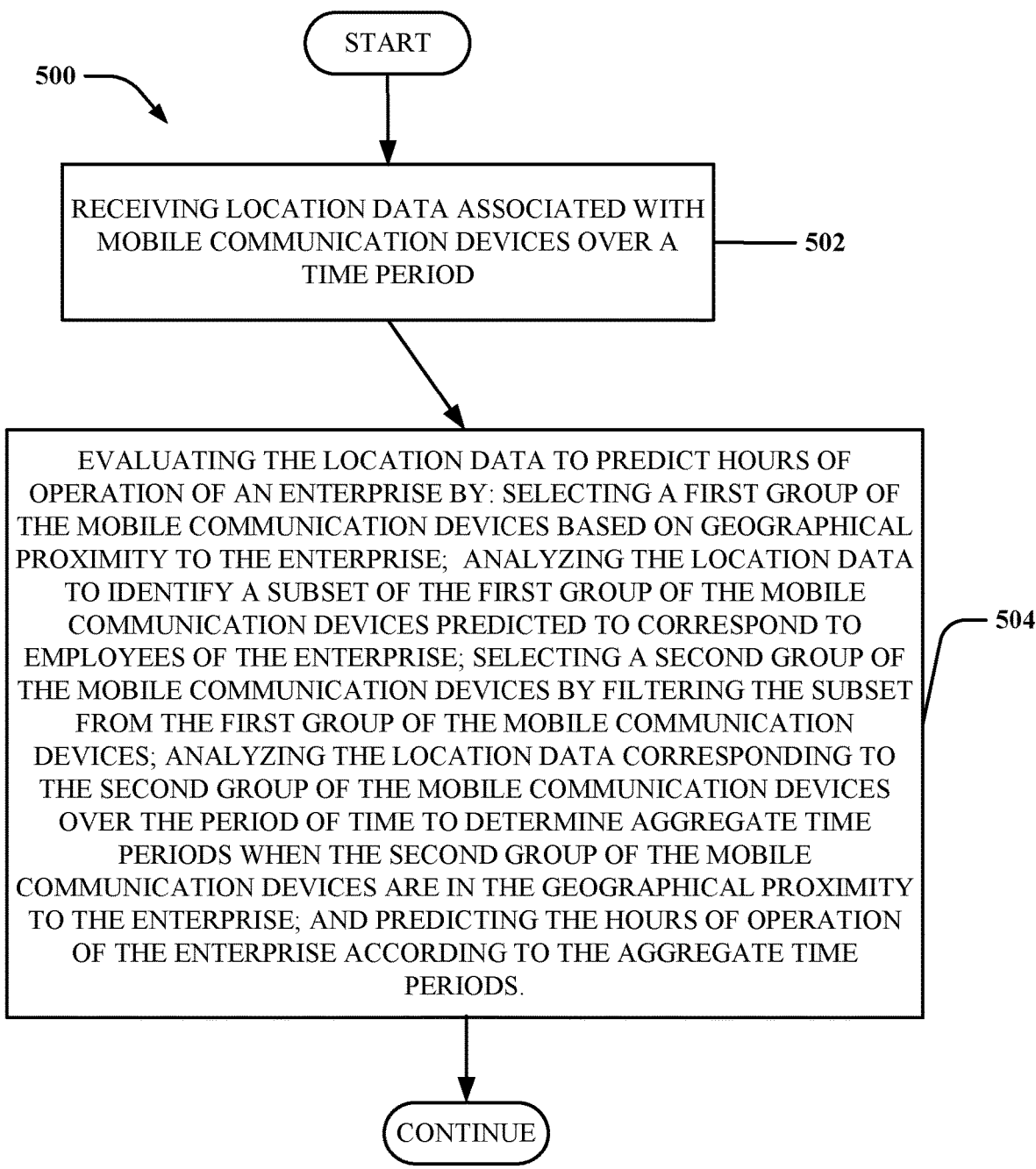
FIG. 5 illustrates a flow diagram of an example, non-limiting embodiment of a method in accordance with various aspects described herein.

Turning now to FIG. 5, a flow diagram 500 of an example, non-limiting embodiment of a method, is shown. In particular, a method is presented for use with one or more functions and features presented in conjunction with FIGS. 1-3 and 4A-4C. Step 502 includes receiving location data associated with mobile devices over a time period. Step 504 includes evaluating the location data to predict hours of operation of an enterprise by: selecting a first group of the mobile devices based on geographical proximity to the enterprise; analyzing the location data to identify a subset of the first group of the mobile devices predicted to correspond to employees of the enterprise; selecting a second group of the mobile devices by filtering the subset from the first group of the mobile devices; analyzing the location data corresponding to the second group of the mobile devices over the period of time to determine aggregate time periods when the second group of the mobile devices are in the geographical proximity to the enterprise; and predicting the hours of operation of the enterprise according to the aggregate time periods.

In accordance with various embodiments, analyzing the location data to identify the subset includes: determining a duration that one of the first group of the mobile devices is in the geographical proximity to the enterprise on a particular date within the time period; and including the one of the first group of the mobile devices in the first subset when the duration exceeds a duration threshold. The method can further include evaluating the location data corresponding to the second group of the mobile devices over the time period to predict future busy time periods of the enterprise and/or future non-busy time periods of the enterprise. Evaluating the location data corresponding to the second group of the mobile devices can include assigning a weighting factor to one or more mobile devices according to a measure of error associated with the location data for the mobile device(s).

In accordance with various embodiments, selecting the first group of the mobile devices based on the geographical proximity to the enterprise includes selecting a first mobile device for inclusion in the first group based on an association of the first mobile device with an access point at a location of the enterprise. Selecting the first group of the mobile devices based on the geographical proximity to the enterprise can include receiving location data associated with a first mobile device that includes geographical coordinates of the first mobile device and comparing the location data to a location of the enterprise. The location data can include geographical coordinate data generated by either the first mobile device or a communication network providing wireless access to the first mobile device. The location data can further include a measure of error associated with the geographical coordinate data and comparison of the location data to the location of the enterprise can include applying a probabilistic filter based on the measure of error associated with the geographical coordinate data.

In accordance with various embodiments, a customer count in a time period is determined by a summation of probabilistic scores of each mobile device in the second group. Predicting the hours of operation can include evaluating the customer count in aggregate time periods. In addition, mobile devices in the subset of the first group can be stored in a database of predicted employees of the enterprise, and these mobile devices in the first group in subsequent time periods are automatically added to the subset when determined to be stored in the database.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
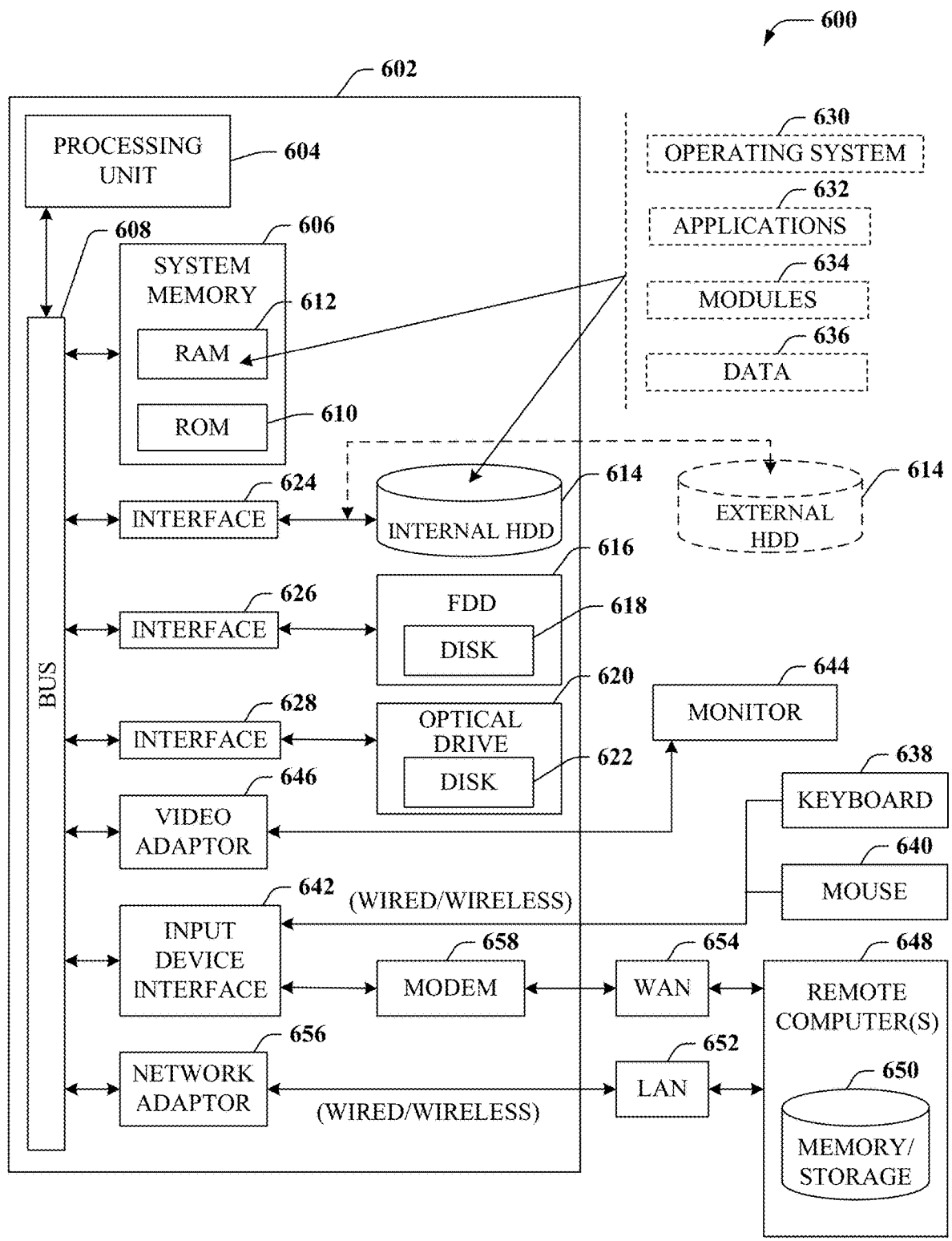
FIG. 6 is a block diagram of an example, non-limiting embodiment of a computing environment in accordance with various aspects described herein.

Turning now to FIG. 6, there is illustrated a block diagram of a computing environment in accordance with various aspects described herein. In order to provide additional context for various embodiments of the embodiments described herein, FIG. 6 and the following discussion are intended to provide a brief, general description of a suitable computing environment 600 in which the various embodiments of the subject disclosure can be implemented. In particular, computing environment 600 can be used in the implementation of network elements 150, 152, 154, 156, access terminal 112, base station or access point 122, switching device 132, media terminal 142, and/or virtual network elements 230, 232, 234, etc., and/or communication system 185. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes a processor as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment can comprise a computer 602, the computer 602 comprising a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), or EEPROM. BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 614 (e.g., EIDE, SATA), which can also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A user can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. It will also be appreciated that in alternative embodiments, a monitor 644 can also be any display device (e.g., another computer having a display, a smart phone, a tablet computer, etc.) for receiving display information associated with computer 602 via any communication means, including via the Internet and cloud-based networks. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the local area network 652 through a wired and/or wireless communication network interface or adapter 656. The adapter 656 can facilitate wired or wireless communication to the LAN 652, which can also comprise a wireless AP disposed thereon for communicating with the wireless adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are an example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 7:
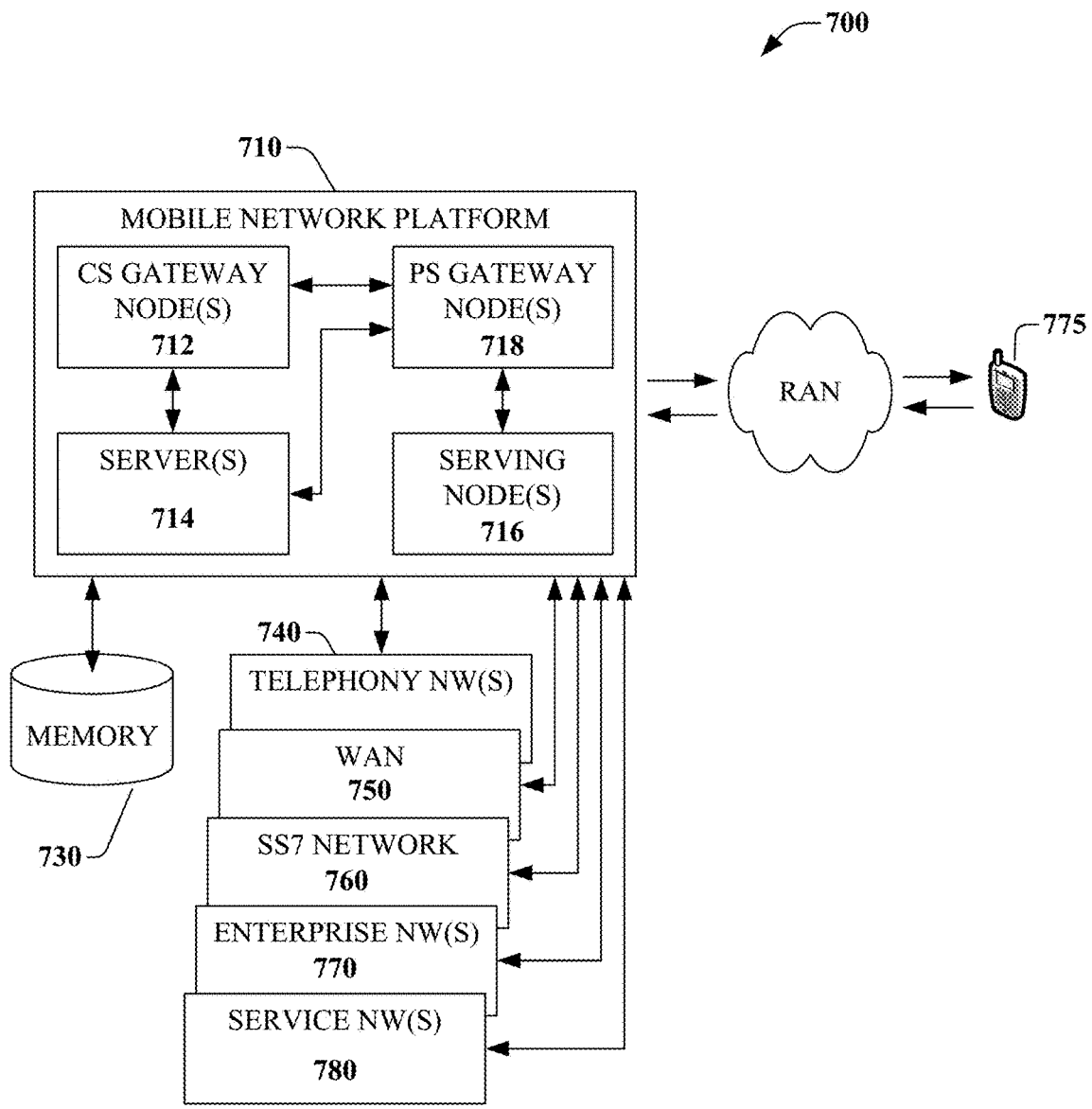
FIG. 7 is a block diagram of an example, non-limiting embodiment of a mobile network platform in accordance with various aspects described herein.

Turning now to FIG. 7, an embodiment 700 of a mobile network platform 710 is shown that is an example of network elements 150, 152, 154, 156, and/or virtual network elements 230, 232, 234, etc. In one or more embodiments, the mobile network platform 710 can generate and receive signals transmitted and received by base stations or access points such as base station or access point 122 in conjunction with service to a mobile device 775, such as a mobile device 124, vehicle 126, data terminal 114 or other wireless device. Generally, mobile network platform 710 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 710 can be included in telecommunications carrier networks, and can be considered carrier-side components as discussed elsewhere herein. Mobile network platform 710 comprises CS gateway node(s) 712 which can interface CS traffic received from legacy networks like telephony network(s) 740 (e.g., public switched telephone network (PSTN), or public land mobile network (PLMN)) or a signaling system #7 (SS7) network 760. Circuit switched gateway node(s) 712 can authorize and authenticate traffic (e.g., voice) arising from such networks. Additionally, CS gateway node(s) 712 can access mobility, or roaming, data generated through SS7 network 760; for instance, mobility data stored in a visited location register (VLR), which can reside in memory 730. Moreover, CS gateway node(s) 712 interfaces CS-based traffic and signaling and PS gateway node(s) 718. As an example, in a 3GPP UMTS network, CS gateway node(s) 712 can be realized at least in part in gateway GPRS support node(s) (GGSN). It should be appreciated that functionality and specific operation of CS gateway node(s) 712, PS gateway node(s) 718, and serving node(s) 716, is provided and dictated by radio technology(ies) utilized by mobile network platform 710 for telecommunication.

In addition to receiving and processing CS-switched traffic and signaling, PS gateway node(s) 718 can authorize and authenticate PS-based data sessions with served mobile devices. Data sessions can comprise traffic, or content(s), exchanged with networks external to the mobile network platform 710, like wide area network(s) (WANs) 750, enterprise network(s) 770, and service network(s) 780, which can be embodied in local area network(s) (LANs), and can also be interfaced with mobile network platform 710 through PS gateway node(s) 718. It is to be noted that WANs 750 and enterprise network(s) 770 can embody, at least in part, a service network(s) like IP multimedia subsystem (IMS). Based on radio technology layer(s) in available technology resource(s), packet-switched gateway node(s) 718 can generate packet data protocol contexts when a data session is established; other data structures that facilitate routing of packetized data also can be generated. To that end, in an aspect, PS gateway node(s) 718 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 700, mobile network platform 710 also comprises serving node(s) 716 that, based upon available radio technology layer(s) within associated technology resource(s), convey the various packetized flows of data streams received through PS gateway node(s) 718. It is to be noted that for technology resource(s) that rely primarily on CS communication, server node(s) can deliver traffic without reliance on PS gateway node(s) 718; for example, server node(s) can embody at least in part a mobile switching center. As an example, in a 3GPP UMTS network, serving node(s) 716 can be embodied in serving GPRS support node(s) (SGSN).

For radio technologies that exploit packetized communication, server(s) 714 in mobile network platform 710 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 710. Data streams (e.g., content(s) that are part of a voice call or data session) can be conveyed to PS gateway node(s) 718 for authorization/authentication and initiation of a data session, and to serving node(s) 716 for communication thereafter. In addition to an application server, server(s) 714 can comprise utility server(s). A utility server can comprise a provisioning server, an operations and maintenance server, a security server that can implement at least in part a certificate authority and firewalls as well as other security mechanisms, and the like. In an aspect, security server(s) secure communication served through mobile network platform 710 to ensure the network's operation and data integrity in addition to authorization and authentication procedures that CS gateway node(s) 712 and PS gateway node(s) 718 can enact. Moreover, provisioning server(s) can provision services from external network(s) like networks operated by a disparate service provider; for instance, WAN 750 or Global Positioning System (GPS) network(s) (not shown). Provisioning server(s) can also provision coverage through networks associated with mobile network platform 710 (e.g., deployed and operated by the same service provider), such as the distributed antennas networks shown in FIG. 1 that enhance wireless service coverage by providing more network coverage.

It is to be noted that server(s) 714 can comprise one or more processors configured to confer at least in part the functionality of macro mobile network platform 710. To that end, the one or more processor can execute code instructions stored in memory 730, for example. It should be appreciated that server(s) 714 can comprise a content manager, which operates in substantially the same manner as described hereinbefore.

In example embodiment 700, memory 730 can store information related to operation of mobile network platform 710. Other operational information can comprise provisioning information of mobile devices served through mobile network platform 710, subscriber databases; application intelligence, pricing schemes, e.g., promotional rates, flatrate programs, couponing campaigns; technical specification(s) consistent with telecommunication protocols for operation of disparate radio, or wireless technology layers; and so forth. Memory 730 can also store information from at least one of telephony network(s) 740, WAN 750, enterprise network(s) 770, or SS7 network 760. In an aspect, memory 730 can be, for example, accessed as part of a data store component or as a remotely connected memory store.

In order to provide a context for the various aspects of the disclosed subject matter, FIG. 7, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 8:
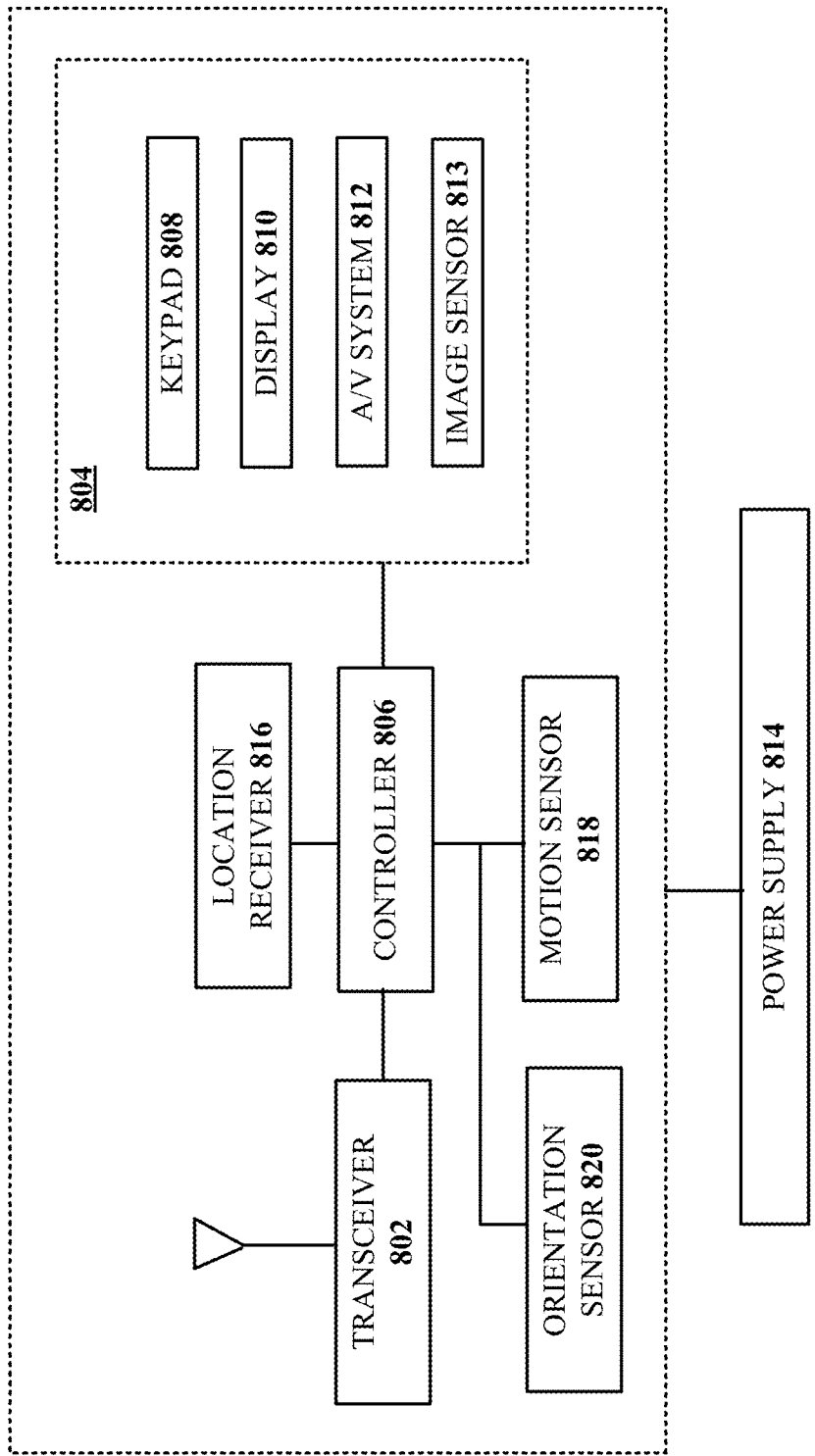
FIG. 8 is a block diagram of an example, non-limiting embodiment of a communication device in accordance with various aspects described herein.

Turning now to FIG. 8, an illustrative embodiment of a communication device 800 is shown. The communication device 800 can serve as an illustrative embodiment of devices such as data terminals 114, mobile devices 124, vehicle 126, display devices 144, mobile devices 310, 312, 314, 316, 318, 320, 322 and/or 401-410 or other client devices for communication via either communications network 125.

The communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface having graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable communications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A communication system comprising:
   at least one memory that stores executable instructions; and
   at least one processor coupled with the at least one memory, wherein the at least one processor, responsive to executing the instructions, facilitates performance of operations, the operations comprising:
      receiving location data associated with mobile devices over a time period, wherein the location data includes first location data for a first mobile device of the mobile devices, wherein the first location data includes geographical coordinates of the first mobile device generated by at least one of the first mobile device or a communication network, and wherein the first location data further includes circular error probable data that defines a circular error probable region around the first mobile device;
      evaluating the location data to predict hours of operation of an enterprise by:
         determining a first group of the mobile devices that are within a boundary corresponding with the enterprise, wherein the first group of the mobile devices includes the first mobile device, and wherein determining the first group of the mobile devices that are within the boundary corresponding to the enterprise includes
            comparing the first location data for the first mobile device to a location associated with the boundary corresponding with the enterprise,
            determining that a portion of the circular error probable region around the first mobile device falls outside of the location associated with the boundary corresponding with the enterprise and that a remaining portion of the circular error probable region around the first mobile device falls within the location associated with the boundary corresponding with the enterprise, and
            assigning a weighting factor to the first mobile device that corresponds with the remaining portion of the circular error probable region around the first mobile device that falls within the location associated with the boundary corresponding with the enterprise;
         analyzing the location data to identify a subset of the first group of the mobile devices predicted to correspond to employees of the enterprise;
         selecting a second group of the mobile devices by filtering the subset from the first group of the mobile devices;
         analyzing the location data corresponding to the second group of the mobile devices over the time period to determine aggregate time periods when the second group of the mobile devices are within the boundary corresponding with the enterprise;
         generating a customer count in the time period for the second group of the mobile devices based, at least in part, on a corresponding weighting factor assigned to each of the second group of the mobile devices including the weighting factor assigned to the first mobile device; and
         predicting the hours of operation of the enterprise by evaluating the customer count in the aggregate time periods; and
      sharing, with at least one content provider, the hours of operation of the enterprise, wherein a screen display presents the hours of operation of the enterprise to a user in conjunction with a consumer application associated with the at least one content provider.

2. The communication system of claim 1, wherein analyzing the location data to identify the subset includes:
   determining a duration that one of the first group of the mobile devices is within the boundary corresponding to the enterprise on a particular date within the time period; and
   including the one of the first group of the mobile devices in the subset when the duration exceeds a duration threshold.

3. The communication system of claim 1,
   wherein the location data corresponding to the second group of the mobile devices is evaluated over the time period to predict a future busy time period of the enterprise based on determining a first customer distribution exceeds a first threshold, and wherein the first customer distribution was determined for a first recurring time period that corresponds to the future busy time period; and
   wherein the location data corresponding to the second group of the mobile devices is evaluated over the time period to predict a future non-busy time period of the enterprise based on determining a second customer distribution falls below a second threshold, and wherein the second customer distribution was determined for a second recurring time period that corresponds to the future non-busy time period.

4. The communication system of claim 1, wherein the at least one processor, responsive to executing the instructions, facilitates performance of further operations comprising:
   evaluating the location data corresponding to the second group of the mobile devices over the time period to predict at least one of:
      future busy time periods of the enterprise, or
      future non-busy time periods of the enterprise; and
   sharing, with the at least one content provider, the at least one of the future busy time periods of the enterprise or the future non-busy time periods of the enterprise wherein the screen display presents the at least one of the future busy time periods of the enterprise or the future non-busy time periods of the enterprise to the user in conjunction with the consumer application associated with the at least one content provider.

5. The communication system of claim 1, wherein mobile devices in the subset of the first group are stored in a database of predicted employees of the enterprise, and wherein mobile devices in a subsequent first group in subsequent time periods that are determined to be stored in the database are automatically excluded from a subsequent second group formed.

6. A method comprising:
receiving, by a communication system comprising a processor, location data associated with mobile devices over a time period, wherein the location data includes first location data for a first mobile device of the mobile devices, wherein the first location data includes geographical coordinates of the first mobile device generated by at least one of the first mobile device or a communication network, and wherein the first location data further includes circular error probable data that defines a circular error probable region around the first mobile device;
evaluating, by the communication system, the location data to predict hours of operation of an enterprise by:
determining, by the communication system, a first group of the mobile devices that are within a boundary corresponding with the enterprise, wherein the first group of the mobile devices includes the first mobile device, and wherein determining the first group of the mobile devices that are within the boundary corresponding to the enterprise includes comparing, by the communication system, the first location data for the first mobile device to a location associated with the boundary corresponding with the enterprise,
determining, by the communication system, that a portion of the circular error probable region around the first mobile device falls outside of the location associated with the boundary corresponding with the enterprise and that a remaining portion of the circular error probable region around the first mobile device falls within the location associated with the boundary corresponding with the enterprise, and
assigning, by the communication system, a weighting factor to the first mobile device that corresponds with the remaining portion of the circular error probable region around the first mobile device that falls within the location associated with the boundary corresponding with the enterprise;
analyzing, by the communication system, the location data to identify a subset of the first group of the mobile devices predicted to correspond to employees of the enterprise;
selecting, by the communication system, a second group of the mobile devices by filtering the subset from the first group of the mobile devices;
analyzing, by the communication system, the location data corresponding to the second group of the mobile devices over the time period to determine aggregate time periods when the second group of the mobile devices are within the boundary corresponding with the enterprise;
generating, by the communication system, a customer count in the time period for the second group of the mobile devices based, at least in part, on a corresponding weighting factor assigned to each of the second group of the mobile devices including the weighting factor assigned to the first mobile device; and
predicting, by the communication system, the hours of operation of the enterprise by evaluating the customer count in the aggregate time periods; and
sharing, by the communication system with at least one content provider, the hours of operation of the enterprise wherein a screen display presents the hours of operation of the enterprise to a user in conjunction with a consumer application associated with the at least one content provider.

7. The method of claim 6, wherein analyzing the location data to identify the subset includes:
determining a duration that one of the first group of the mobile devices is within the boundary corresponding to the enterprise on a particular date within the time period; and
including the one of the first group of the mobile devices in the subset when the duration exceeds a duration threshold.

8. The method of claim 6,
wherein the location data corresponding to the second group of the mobile devices is evaluated over the time period to predict a future busy time period of the enterprise based on determining a first customer distribution exceeds a first threshold, and wherein the first customer distribution was determined for a first recurring time period that corresponds to the future busy time period; and
wherein the location data corresponding to the second group of the mobile devices is evaluated over the time period to predict a future non-busy time period of the enterprise based on determining a second customer distribution falls below a second threshold, and wherein the second customer distribution was determined for a second recurring time period that corresponds to the future non-busy time period.

9. The method of claim 6, wherein the method further comprises:
evaluating the location data corresponding to the second group of the mobile devices over the time period to predict at least one of:
future busy time periods of the enterprise, or
future non-busy time periods of the enterprise; and
sharing, with the at least one content provider, the at least one of the future busy time periods of the enterprise or the future non-busy time periods of the enterprise wherein the screen display presents the at least one of the future busy time periods of the enterprise or the future non-busy time periods of the enterprise to the user in conjunction with the consumer application associated with the at least one content provider.

10. The method of claim 6, wherein mobile devices in the subset of the first group are stored in a database of predicted employees of the enterprise, and wherein mobile devices in a subsequent first group in subsequent time periods that are determined to be stored in the database are automatically excluded from a subsequent second group formed.

11. An article of manufacture that includes a tangible storage medium that stores operational instructions, that when executed by a processor, causes the processor to perform operations comprising:
receiving location data associated with mobile devices over a time period, wherein the location data includes first location data for a first mobile device of the mobile devices, wherein the first location data includes geographical coordinates of the first mobile device generated by at least one of the first mobile device or a communication network, and wherein the first location data further includes circular error probable data that defines a circular error probable region around the first mobile device;

evaluating the location data to predict hours of operation of an enterprise by:

determining a first group of the mobile devices that are within a boundary corresponding with the enterprise, wherein the first group of the mobile devices includes the first mobile device, and wherein determining the first group of the mobile devices that are within the boundary corresponding to the enterprise includes comparing the first location data for the first mobile device to a location associated with the boundary corresponding with the enterprise, determining that a portion of the circular error probable region around the first mobile device falls outside of the location associated with the boundary corresponding with the enterprise and that a remaining portion of the circular error probable region around the first mobile device falls within the location associated with the boundary corresponding with the enterprise, and assigning a weighting factor to the first mobile device that corresponds with the remaining portion of the circular error probable region around the first mobile device that falls within the location associated with the boundary corresponding with the enterprise;

analyzing the location data to identify a subset of the first group of the mobile devices predicted to correspond to employees of the enterprise;

selecting a second group of the mobile devices by filtering the subset from the first group of the mobile devices;

analyzing the location data corresponding to the second group of the mobile devices over the time period to determine aggregate time periods when the second group of the mobile devices are within the boundary corresponding with the enterprise;

generating a customer count in the time period for the second group of the mobile devices based, at least in part, on a corresponding weighting factor assigned to each of the second group of the mobile devices including the weighting factor assigned to the first mobile device; and predicting the hours of operation of the enterprise by evaluating the customer count in the aggregate time periods; and sharing, with at least one content provider, the hours of operation of the enterprise, wherein a screen display presents the hours of operation of the enterprise to a user in conjunction with a consumer application associated with the at least one content provider.

12. The article of manufacture in claim 11, wherein the location data corresponding to the second group of the mobile devices is evaluated over the time period to predict a future busy time period of the enterprise based on determining a first customer distribution exceeds a first threshold, and wherein the first customer distribution was determined for a first recurring time period that corresponds to the future busy time period; and wherein the location data corresponding to the second group of the mobile devices is evaluated over the time period to predict a future non-busy time period of the enterprise based on determining a second customer distribution falls below a second threshold, and wherein the second customer distribution was determined for a second recurring time period that corresponds to the future non-busy time period.

* * * * *